3,558,152
PALLET DOLLY
Ray P. Miles, 8575 W. Melody Lane, Macedonia, Ohio
  44056, and Andrew E. Szucs, 4479 W. 226th St., Fairview Park, Ohio 44126
Filed Sept. 27, 1968, Ser. No. 763,312
Int. Cl. B62b 3/00
U.S. Cl. 280—47.16                                1 Claim

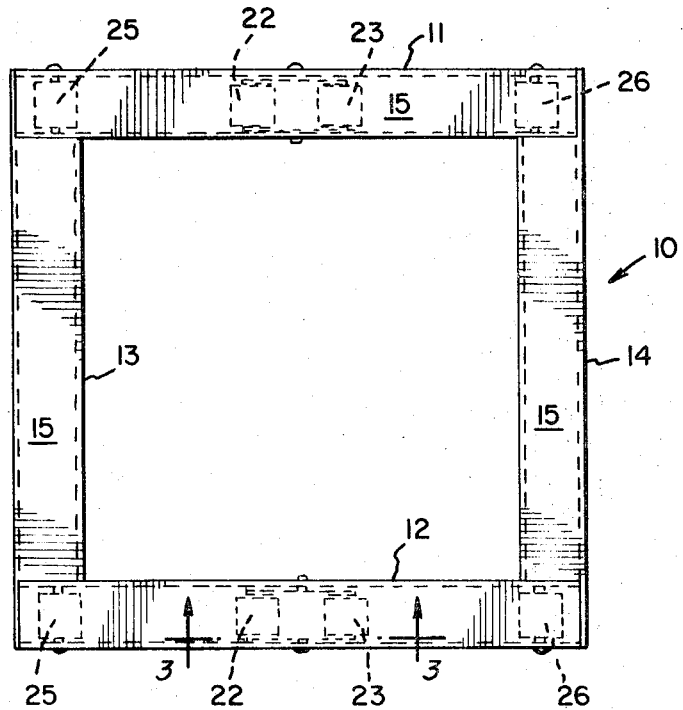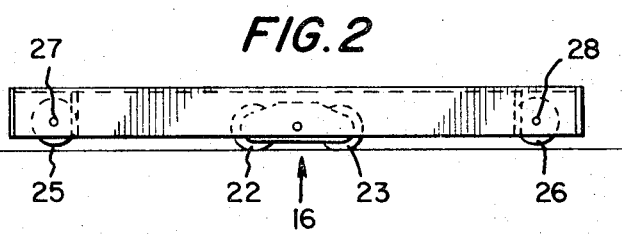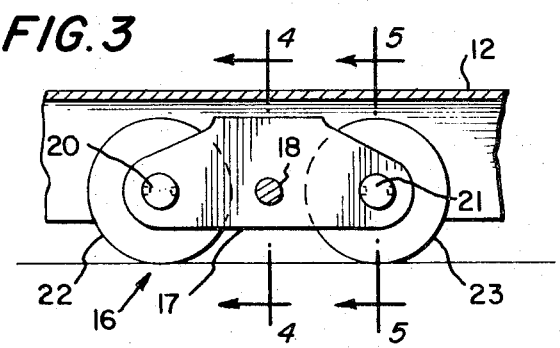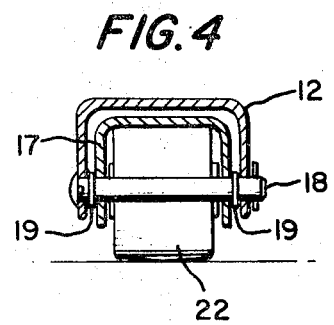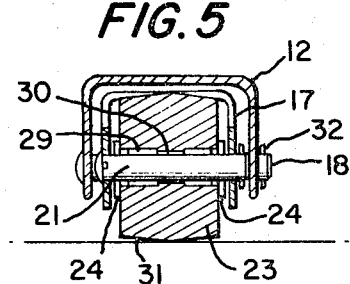

ABSTRACT OF THE DISCLOSURE

The invention relates to a pallet dolly of simplified construction which comprises a box frame containing parallel U-shaped members as part of the frame. Within each U-shaped member at its midsection, there is provided a pivotable saddle device containing a pair of rollers. A roller is also provided at each end of the U-shaped member. The end rollers are mounted slightly above the midsection rollers to enable the dolly to be tipped forward or backward on the end rollers for maneuverability.

---

This invention relates to a vehicle for the handling of freight and the like. More particularly, it relates to a pallet dolly capable of transporting a pallet load from one place to another.

It is common practice today to unitize freight for uniform transport from one place to another. The unit loads are built up on a pallet. The pallet load is accordingly transported to railroad cars or trucks by means of fork lift trucks. Normally the fork lift trucks are used to move the pallet load from storage, production line, docks, etc., to various places. The pallet load is deposited wherever desired. However, in certain cases, the fork lift truck is incapable of transporting the pallet load to the exact location desired. As in the case of storage areas, it may be desirable to store the pallet loads as close as possible to each other. The maneuverability of the fork lift trucks is limited and accordingly other means are used for the desired purpose. Also, where pallet loads are being loaded into a transporting means, it is desirable to keep the pallet load mobile after the fork lift has deposited the load.

This invention provides a pallet dolly useful for pallet loads for loading and discharging trucks and railroad cars; useful with live storage in trucks or receiving docks; useful with transportation from production lines to storage areas; useful with transportation on elevators; useful as a substitute for platform trucks; and useful to keep pallet loads mobile.

Accordingly an object of this invention is to provide a pallet dolly having an open unitary box frame containing a minimum of rollers capable of easy maneuverability and having a swivel design with titt ends which allows the pallet load to be steered.

Another object of this invention is to provide a pallet dolly as above having a closed top construction with a high load bearing surface and having wider roller tracks for more stable loads.

Another object of this invention is to provide a pallet dolly as above wherein the rollers are arranged so that pairs of rollers at the midsection of the dolly normally engage the floor surface and rollers at the ends of the dolly engage the floor surface only when the dolly is titled forward or backward, thus facilitating steering of the dolly.

Other objects, advantages, and novel features of the pallet dolly will become apparent from the following description and drawings of a complete embodiment of the invention, wherein:

FIGURE 1 is a diagrammatic plan view of the pallet dolly of this invention, as seen from above, of the framework thereof showing the positioning of the rollers;

FIGURE 2 is a side elevational view of the pallet dolly of FIGURE 1 showing structural details thereof;

FIGURE 3 is an enlarged sectional view taken along line 3—3 of FIGURE 1 showing in greater detail the rollers at the midsection of the pallet dolly;

FIGURE 4 is a sectional view taken along line 4—4 of FIGURE 3; and

FIGURE 5 is a sectional view taken along line 5—5 of FIGURE 3.

Referring now to the drawing which illustrates one embodiment of the invention and wherein similar reference numerals are used to denote the same elements throughout the various views shown, 10 generally indicates a pallet dolly having a unitized box frame assembly. The assembly comprises a pair of parallel U-shaped extrusions 11 and 12 which are joined together at right angles with another pair of parallel U-shaped extrusions 13 and 14 to form an open box frame. The ends of extrusions 13 and 14 are welded to the end portions of extrusions 11 and 12 to provide a unit box construction which is more rugged under abusive use and provides for maximum torsional rigidity. The load bearing area 15 is more than adequate for handling pallets of various sizes and loads and the closed top construction provides protection for the rollers underneath. The extrusions may be made from aluminum and the like providing a lightweight dolly which may be easily carried from place to place.

The extrusions 11 and 12 are each provided with rollers at their midsection and at their ends. Referring now to extrusion 12 for greater detail, it will be understood that extrusion 11 will have the identical construction.

At the midsection and within extrusion 12, there is provided a roller assembly generally designated as 16. The roller assembly comprises a housing or saddle member 17 which is rotational mounted on pivot pin 18 at its midsection. Pivot pin 18 is mounted crosswise near the bottom of the extrusion 12. Spacers 19 are provided between the side surfaces of extrusion 12 and the outside surfaces of saddle 17. Within the two extremities of the saddle 17, two axles 20 and 21 are mounted crosswise. As shown, rollers 22 and 23 are mounted for individual rotation on axles 20 and 21, respectively. Washers 24 are provided between the inside saddle surfaces and the rollers. Axles 20 and 21 and pivot pin 18 are mounted parallel with their center lines in the same plane.

At the ends of extrusion 12, rollers 25 and 26 are provided. The rollers are mounted on axles 27 and 28, respectively. The axles 27 and 28 are mounted crosswise within the extrusion and slightly higher than the plane of axles 20 and 21, and pivot pin 18.

Rollers 22, 23, 25 and 26 are identical in construction and may be made from aluminum, phenolic resins, and the like. The rollers may be up to four inches wide or more and have diameters up to about four inches. As shown in FIGURE 5, roller bearings 29 may be of the sealed needle type bearings and are provided within a center hole 30 of the roller. Roll pins 32 may be provided on the axles or pivot pin or any other suitable means. The outside roller surfaces 31 are slightly chamfered or crowned. With this type of rollers, extremes in pressure are resisted for easy maneuvering.

Since the rollers 25 and 26 are positioned to be slightly above ground the load on surfaces 15 is primarily carried by rollers 22 and 23 which always contact the ground surface. With this arrangement, the ends of the pallet dolly may be tilted either up or down around pivot pin 18, whereby the load is additionally carried by either rollers 25 or 26. In this manner, the dolly may be easily steered. Thus, if it is desired to turn the dolly, the dolly is adjusted to ride only on rollers 22 and 23 and one side of the dolly is pushed in the direction desired.

It can be seen that the novel pallet dolly of our invention embodies a number of significant features and advantages which increase the safety of pallet load handling and which is easily maneuverable. A particularly significant aspect of the invention is its simplicity in design and the resultant reduced construction costs.

While a specific embodiment of the invention has been described, it is to be understood that the invention is not limited to the specific features shown and various changes may be made in its construction by those skilled in the art, without departing from the spirit of the invention as defined by the appended claim.

What is claimed is:

1. A pallet dolly capable of being tilted forward and backward to enable steering and maneuverability thereof comprising:
   a flat surfaced, rectangular frame assembly comprising at least one pair of parallel U-shaped members;
   said one pair of U-shaped members each comprising a roller mounted crosswise within and adjacent each end thereof, and a roller assembly mounted within a saddle member which is pivotally mounted crosswise with the midsection of said U-shaped member;
   said rollers having chamfered rolling surfaces and said end rollers being mounted slightly above said roller assembly whereby said roller assembly normally contacts a ground surface; and
   said saddle member comprising two rollers which are disposed in-line along said U-shaped member.

References Cited

UNITED STATES PATENTS 2,713,179  7/1955  Clifton _____ 280—79.1X
2,805,078  9/1957  Robinson _____ 280—79.1

LEO FRIAGLIA, Primary Examiner

L. J. PAPERNER, Assistant Examiner

U.S. Cl. X.R.

280—79.1

UNITED STATES PATENT OFFICE
CERTIFICATE OF CORRECTION

Patent No. 3,558,152          Dated January 26, 1971

Inventor(s) RAY P. MILES and ANDREW E. SZUCS

It is certified that error appears in the above-identified patent and that said Letters Patent are hereby corrected as shown below:

Column 1, line 54, change "titt" to --tilt--

Column 1, line 54, change "whlch" to --which--

Column 2, line 35, change "rotational" should read -- rotationally --.

Column 3, line 21, change "with" to --within--

Signed and sealed this 19th day of February 1974.

(SEAL)
Attest:

EDWARD M. FLETCHER, JR.
Attesting Officer

C. MARSHALL DANN
Commissioner of Patents